United States Patent [19]
Kuntze

[11] Patent Number: 4,715,554
[45] Date of Patent: Dec. 29, 1987

[54] FISHING LINE SUPPLY SPOOL AND METHOD OF USE

[76] Inventor: Rupert Kuntze, Kudowastrasse 9, D-1000 Berlin 33, Fed. Rep. of Germany

[21] Appl. No.: 850,177

[22] Filed: Apr. 10, 1986

[30] Foreign Application Priority Data

Aug. 9, 1985 [DE] Fed. Rep. of Germany ....... 3528616

[51] Int. Cl.$^4$ ............ A01K 89/00; B65H 54/00
[52] U.S. Cl. ..................... 242/84.2 R; 43/25; 43/25.2; 242/47; 242/85; 242/96; 242/118.4
[58] Field of Search ............ 242/118.4, 118.41, 118.5, 242/118.6, 118.7, 118.8, 117, 96, 85, 85.1, 84.1 R, 84.2 R:106, 84.1 K, 105, 128; 43/25, 25.2

[56] References Cited

U.S. PATENT DOCUMENTS

| | | | |
|---|---|---|---|
| D. 19,909 | 6/1890 | Brockway | 242/118.4 X |
| 1,260,512 | 3/1918 | Chase | 242/118.4 |
| 1,408,261 | 2/1922 | Brookhart | 242/85.1 |
| 2,678,780 | 5/1954 | Klein | 242/118.7 |
| 2,855,717 | 10/1958 | Heil | 242/96 |
| 3,298,127 | 9/1964 | Bedell | 43/25.2 |
| 3,670,987 | 6/1972 | Roebuck | 242/118.4 |
| 4,493,462 | 1/1985 | Ditton | 242/96 X |

FOREIGN PATENT DOCUMENTS 1541078  2/1979  United Kingdom ............... 242/96

*Primary Examiner*—Stanley N. Gilreath
*Attorney, Agent, or Firm*—Bacon and Thomas

[57] ABSTRACT

A spool for a supply of fishing line is disclosed which serves too minimize the amount of twist imparted to the line as it is withdrawn from the spool onto a fishing reel. A cylindrical portion, about which the fishing line is wound on the spool, has radial flanges having different shapes so as to permit withdrawal of the line over only one flange periphery. The line may be effectively withdrawn from the spool only over the circular flange, but not over the opposite flange, which has a non-circular shape. Any twist imparted to the fishing line during its withdrawal is substantially compensated by the winding of the line about the fishing reel.

12 Claims, 7 Drawing Figures

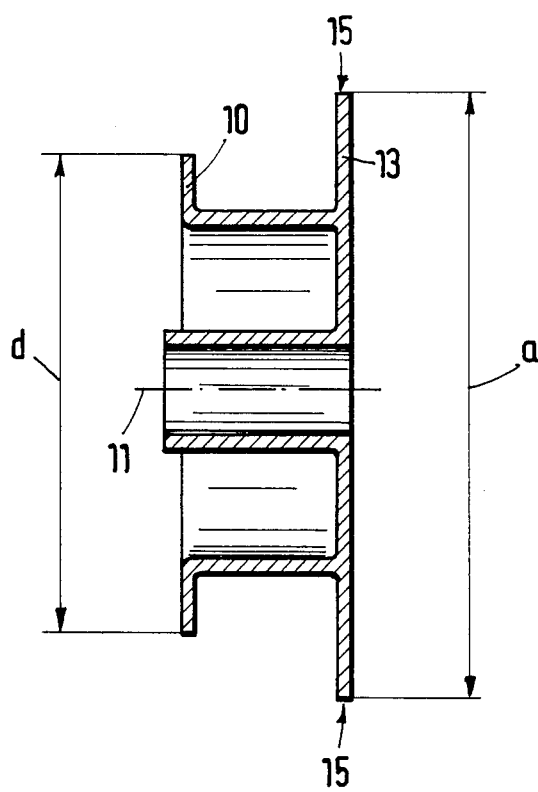

FISHING LINE SUPPLY SPOOL AND METHOD OF USE

FIELD OF THE INVENTION

The present invention relates to a spool containing a supply of fishing line, the spool having a means to minimize the twist imparted to the line as it is removed from the spool.

BRIEF DESCRIPTION OF THE PRIOR ART

When a fishing line is withdrawn from the prior art supply spools, such as, for instance, when the fishing line is being wound upon a fishing reel, a twist is imparted to the line. The twist usually is 360 degrees for each turn removed from the supply spool. This twist about the longitudinal axis of the line is disadvantageous insofar as fibers of the fishing line project perpendicularly from the surface which may cause the line to become entangled in the fishing reel reversing rollers, the fishing rod guide rings or the like.

SUMMARY OF THE INVENTION

The present invention provides a supply spool for a fishing line and a method of use in which the twist imparted to the line during its removal from the spool is minimized. The spool has a generally cylindrical portion with first and second lateral edges; a first flange extending radially outwardly from the first lateral edge having a substantially circular periphery; and a second flange extending radially outwardly from the second lateral edge having a non-circular periphery. The lateral dimension of the second flange is greater than the diameter of the first flange. A supply of fishing line is wound onto the generally cylindrical portion of the spool in a clockwise direction, as viewed from the first flange. The difference in shape between the first and second flanges, as well as their difference in dimensions, forces the user to unwind the fishing line from the spool over the first flange.

Most standard, commercial fishing reels wind the fishing line about the reel in a clockwise direction, as viewed from the front of the fishing reel. When a free end of the fishing line is attached to the reel and the line passed over a reversing roller, the twist that is generated as the fishing line is withdrawn over the first spool flange is opposite in direction to the twist imparted to the fishing line after it has passed over the reversing roller and wound in the clockwise direction on the fishing reel. Thus, the twists in opposite direction are substantially offset and a minimum twist is imparted to the fishing line.

The smaller first flange and the larger, non-circular second flange force the user to withdraw the fishing line over the first flange in a direction generally perpendicular to the plane of the coils wound on the spool.

BRIEF DESCRIPTION OF THE DRAWINGS

FIG. 7 is a cross-sectional view of the spool taken along line VII—VII in FIG. 6.

DETAILED DESCRIPTION OF THE PREFERRED EMBODIMENTS

Figure 1:
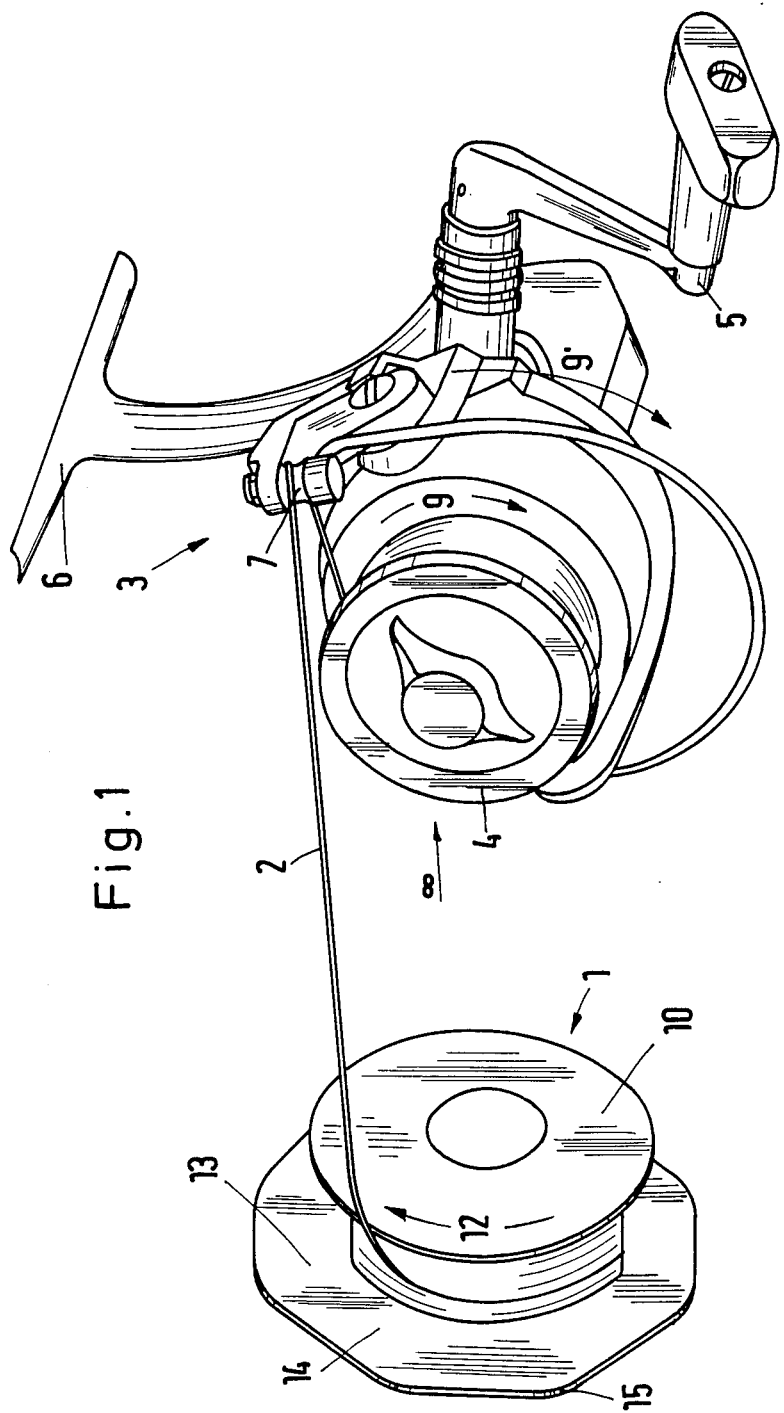
FIG. 1 is a perspective, schematic view of the spool according to the invention and its association with a fishing reel during the removal of the fishing line from the spool.

As best seen in FIG. 1, the spool generally indicated at 1 has a supply of fishing line 2 wound about its cylindrical section. The fishing line 2 is attached at one end to the fixed reel 4 of fishing reel assembly 3. The line 2 passes over reversing roller 7 which forms a known part of the fishing reel assembly 3. Winding means 5 is manually rotated by the user and serves to rotate the fishing reel mechanism, including the reversing roller 7 about the fixed reel 4 in a clockwise direction as denoted by arrow 9'. As the mechanism rotates in the direction of this arrow, the fishing line 2 is wound on the reel 4 in a clockwise direction as viewed from the front of the reel in the direction of arrow 8. The direction of the winding of the fishing line in this clockwise direction is indicated by arrow 9.

During this winding, the fishing line 2 is withdrawn from spool 1 over the edge of flange 10, such that it slides around the periphery of this flange. Generally, the line 2 is withdrawn from the spool in a direction perpendicular to the plane of the windings on the cylindrical portion of the spool i.e. in a direction generally parallel to the central axis 11 (see FIG. 7) of the spool. During the unwinding of the line from the spool, the take-up spool does not rotate. Fishing line 2 is wound onto the cylindrical portion of the spool in a clockwise direction, indicated by arrow 12, when viewed from the first flange 10.

During the withdrawal of the line 2 from the spool 1, it is twisted about its longitudinal axis. However, as the line 2 is wound onto the fishing reel 4 in the aforementioned direction, it receives a twist in the opposite direction which substantially compensates for the initial twist imparted to the line.

As best seen in FIG. 7, the spool has a central, generally cylindrical portion with first and second lateral edges, a first flange 10 extending radially outwardly from the first lateral edge and a second radial flange 13 extending radially outwardly from the second lateral edge. The periphery of the first flange 10 is substantially circular to facilitate the passage of the fishing line over its periphery. The periphery 15 of flange 13 assumes a non-circular shape to prevent the user from inadvertently attempting to withdraw the fishing line over this periphery.

Figure 2:
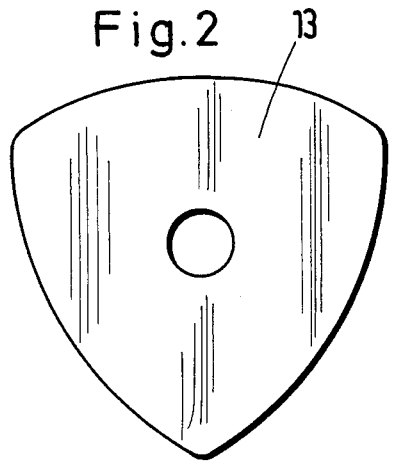
FIGS. 2–6 show alternative shapes which may be defined by the periphery of the second spool flange according to the invention.
Figure 3:
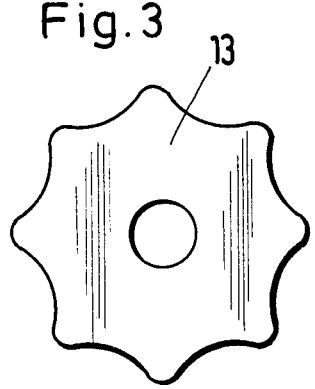
Figure 4:
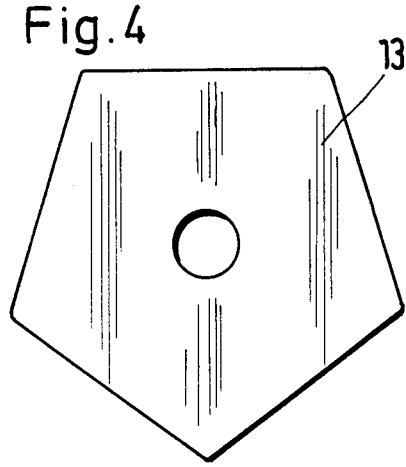
Figure 5:
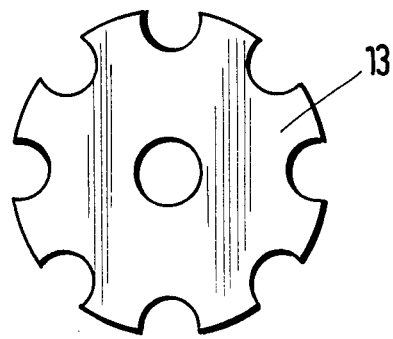
Figure 6:
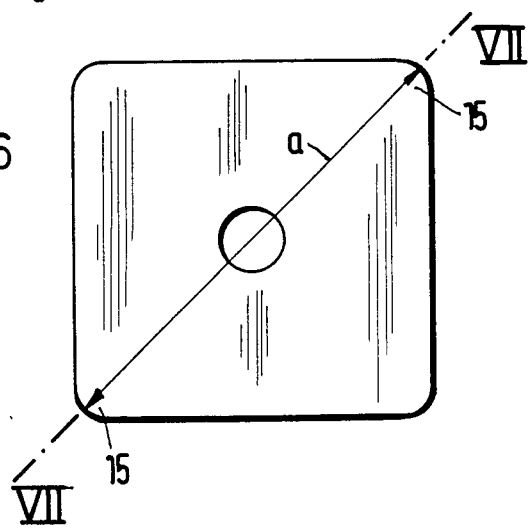

The periphery 15 of flange 13 is shown as being octagonal in FIG. 1, but it may assume any shape, such as those illutrated in FIGS. 1–6. FIGS. 2, 4 and 6 show the periphery in the shape of a polygon, a triangle, a pentagon and a square, respectively. FIGS. 3 and 5 show the periphery of the second flange defining a plurality of concave indentations or notches. As can be seen, any attempt to withdraw the fishing line 2 about any of these peripheral shapes will result in great inconvenience to the user. Thus, he is required to withdraw the fishing line over the proper flange 10.

This requirement is further reinforced by providing the second flange 13 with a lateral dimension a (seen in FIGS. 6 and 7), which is greater than the diameter of d of the first flange 10. In addition, the diameter of the generally cylindrical portion about which the fishing line is wound, may be adapted to be substantially equal to that of a fishing reel 4.

The foregoing is provided for illustrative purposes only and should not be construed as in any way limiting this invention, the scope of which is defined solely by the claims appended hereto.

What is claimed is:

1. An antitwist system for transferring fishing line from a supply spool to a fishing reel comprising:
    (a) a fishing reel having winding means rotatable about an axis in a first direction of rotation when viewed from an operator's position behind the fishing reel;
    (b) a supply spool comprising: (i) a generally cylindrical portion having first and second edges; (ii) a first flange extending radially outwardly from and fixedly attached to the first edge, the first flange having a first lateral dimension and a substantially circular periphery; and, (iii) a second flange extending radially outwardly from and fixedly attached to the second edges, the second flange having a non-circular periphery and at least one lateral dimension greater than the first lateral dimension, the supply spool adapted to be non-rotatably oriented such that the first flange faces the fishing reel;
    (c) a supply of fishing line wound onto the cylindrical portion of the supply spool in a second direction opposite to the first direction of rotation when viewed from the operator's position, the supply having a free end; and,
    (d) means to attach the free end of the fishing line to the fishing reel such that, as the winding means are rotated about the axis in the first direction of rotation, the fishing line is wound onto the fishing reel in the first direction and unwound from the non-rotating supply spool in contact with the periphery of the first flange in the first direction as viewed from the operator's position whereby the twist in the line caused by the winding on the fishing reel is opposite to the twist caused by unwinding from the supply spool so as to minimize the twist imparted to the fishing line.

2. The spool according to claim 1 wherein the periphery of the second flange defines a polygon.

3. The spool according to claim 1 wherein the periphery of the second flange defines an oval.

4. The spool according to claim 1 wherein the periphery of the second flange defines a triangle.

5. The spool according to claim 1 wherein the periphery of the second flange defines an octagon.

6. The spool according to claim 1 wherein the periphery of the second flange defines a pentagon.

7. The spool according to claim 1 wherein the periphery of the second flange defines a square.

8. The spool according to claim 1 wherein the periphery of the second flange defines a plurality of notches.

9. The spool according to claim 1 wherein the first flange has a diameter d and wherein the second flange has a dimension a such that $a > d$.

10. The spool according to claim 1 wherein the fishing reel has a diameter and wherein the diameter of the cylindrical portion is approximately equal to the diameter of the fishing reel.

11. The spool according to claim 1 wherein the periphery of the second flange defines a plurality of concave indentations.

12. A method for winding a fishing line onto a fishing reel from a supply of fishing line wound on a supply spool so as to impart a minimu twist to the line comprising the steps of:
    (a) winding a supply of fishing line onto a cylindrical portion of the supply spool having a first flange extending laterally outwardly from and fixedly attached to the cylindrical portion, the first flange having a substantially circular periphery with a first lateral dimension and a second flange extending laterally outwardly from and fixedly attached to the cylindrical portion, the second flange having a non-circular periphery with at least one second lateral dimension greater than the first lateral dimension such that the supply of fishing line has a free end to facilitate withdrawing the line from the spool in a fixed direction, the supply of fishing line being wound on the spool in a clockwise direction when the spool is viewed opposite the fixed direction;
    (b) attaching a free end of the fishing line to the fishing reel such that the line passes over a reversing roller;
    (c) retaining the supply spool in a fixed position;
    (d) removing the fishing line from the spool over the first flange in a direction substantially perpendicular to a plane containing the winding such that, when viewed in a direction opposite to the direction of travel of the line removed from the spool, the line is removed from the spool in counterclockwise fashion; and,
    (e) winding the fishing line onto the fishing reel in a clockwise direction, when viewed in the direction of travel of the line between the spool and the reel.

* * * * *